(12) United States Patent
Mordukhovich

(10) Patent No.: US 9,027,462 B2
(45) Date of Patent: May 12, 2015

(54) PISTON RING WITH IMPROVED LUBRICATION DELIVERY

(75) Inventor: Gregory Mordukhovich, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 675 days.

(21) Appl. No.: 13/347,767

(22) Filed: Jan. 11, 2012

(65) Prior Publication Data

US 2013/0174726 A1    Jul. 11, 2013

(51) Int. Cl.
*F16J 9/20* (2006.01)
*F16J 9/06* (2006.01)
*F16J 9/26* (2006.01)

(52) U.S. Cl.
CPC .... *F16J 9/06* (2013.01); *F16J 9/20* (2013.01); *F16J 9/26* (2013.01)

(58) Field of Classification Search
CPC .......................................................... F16J 9/20
USPC ............................. 92/158, 159; 277/452, 460
See application file for complete search history.

(56) References Cited

U.S. PATENT DOCUMENTS

| | | | |
|---|---|---|---|
| 1,632,119 A | 6/1927 | Davenport | |
| 1,949,612 A * | 3/1934 | Mattair et al. | 92/159 |
| 2,078,748 A * | 4/1937 | Wenzel | 277/462 |
| 2,194,732 A * | 3/1940 | Aikman | 92/159 |
| 2,211,456 A * | 8/1940 | Caldwell | 92/159 |
| 2,322,963 A * | 6/1943 | Horton | 92/159 |
| 2,638,391 A * | 5/1953 | Heusser | 92/159 |
| 3,669,461 A | 6/1972 | Togami | |
| 3,690,686 A | 9/1972 | Prasse | |
| 3,697,091 A | 10/1972 | Prasse | |
| 3,794,334 A | 2/1974 | Prasse | |
| 3,944,236 A | 3/1976 | Takao | |
| 3,988,119 A | 10/1976 | Takahashi | |
| 4,185,843 A | 1/1980 | Beyer | |
| 4,203,353 A * | 5/1980 | Burnham et al. | 92/159 |
| 4,218,494 A | 8/1980 | Belmondo | |
| 4,233,072 A | 11/1980 | Watanabe | |
| 4,244,280 A * | 1/1981 | Stoll | 92/159 |
| 4,251,599 A | 2/1981 | McCormick | |
| 4,612,256 A | 9/1986 | Neuhauser | |
| 5,002,025 A | 3/1991 | Crouse | |

FOREIGN PATENT DOCUMENTS

| | | |
|---|---|---|
| JP | 5025696 | 2/1993 |
| JP | 2008032034 A | 2/2008 |
| JP | 2010071248 | 4/2010 |

* cited by examiner

*Primary Examiner* — F. Daniel Lopez
(74) *Attorney, Agent, or Firm* — Reising Ethington P.C.

(57) ABSTRACT

A piston ring has a body member for sitting in a ring groove of a piston. The body member has an inner periphery, upper wall, lower wall and an outer periphery. The outer periphery has a concavity therein for storing lubricant therein. The upper wall has an outer section proximate to the outer periphery is constructed to be resiliently flexible between a flexed and unflexed position such during a portion of a power stroke, the volume of the concavity to store the lubricant is decreased by the flexing of the upper wall to the flexed position for expelling lubricant therefrom to a wall of the cylinder. The wall resiliently returns to the unflexed position during other times to allow excess lubricant from the wall of the cylinder to pass into the concavity.

20 Claims, 2 Drawing Sheets

PISTON RING WITH IMPROVED LUBRICATION DELIVERY

TECHNICAL FIELD

This invention relates to a piston ring and more particularly to a split piston ring for a piston in an internal combustion engine.

BACKGROUND OF THE INVENTION

Pistons in internal combustion engines have long incorporated piston rings to improve performance. Piston rings reduce blow-by of gases during the compression and power strokes and allow lubricating oil or other lubricant to coat the cylinder wall but prevent excessive lubricating oil from entering the combustion chamber.

Many types of piston rings have been developed having differently contoured outer peripheries. For example, piston rings may have a taper face, a barrel face, or a plain face. The piston ring, commonly made from iron, may also have a porous coating, film, outer layer or surface to pick up oil for forming a lubricant film as it glides against the engine cylinder wall.

The piston ring construction may have the ring being substantially planar or it may incorporate a negative or positive twist in its relaxed position. The shape or twist of the piston ring, during operation of the piston ring, may change during the down strokes and the upward strokes for providing wiping of the lubricant during the down stroke and bypassing the lubricant film during the upstroke.

Lubrication regimes always balance the need to provide as low a viscosity of the lubricant as possible to decrease the inherent friction of the lubricant but also provide the needed high viscosity near the top dead center position of the power stroke to reduce mixed/boundary lubrication regimes. Not only is it recognized that the lubricant film thickness may vary and different lubrication requirements may be needed during different crank angles of the engine, but different circumferential positions around the piston may have different lubrication requirements particularly if there is a distorted cylinder bore, the piston has a tilt, or the piston and piston ring are not truly cylindrical.

What is need is an improved piston ring that provides for a cavity that absorbs and stores lubricant when excess lubricant is on the engine cylinder wall and can provide additional lubricant during the power stroke when more lubrication is needed.

SUMMARY OF THE INVENTION

In accordance with one embodiment of the invention, a piston ring for a piston of an engine cylinder; includes a body member for sitting in a ring groove of the piston. The body member has an inner periphery, upper wall, lower wall and an outer periphery. The outer periphery has a concavity therein for storing lubricant therein. The upper wall has an outer section proximate to the outer periphery and is constructed to be resiliently flexible between a flexed and unflexed position such during a portion of a power stroke, the volume of the concavity to store the lubricant is decreased by the flexing of the upper wall to the flexed position in order to expel lubricant therefrom to a wall of the cylinder. The upper wall resiliently returns to the unflexed position at other times to allow excess lubricant from the wall of the cylinder to pass into the concavity.

Preferably, an insert member is housed in the concavity. The insert member is porous to absorb lubricant and compressible to release the lubricant.

In one embodiment, the insert member is a woven carbon fiber. The piston ring preferably has a positive stop member for limiting the flexing of the upper wall and the compression of the insert member. In one embodiment, the stop member may be a plurality of teeth at the outer periphery. Preferably, the upper wall has its outer section tapered to the outer periphery. In one embodiment, the concavity is asymmetrically positioned closer to the upper wall than the lower wall.

In accordance with another aspect of the invention, a piston for an engine cylinder of an internal combustion engine has a piston head having a side wall with at least one annular groove for seating a piston ring. The piston ring has a body member for sitting in a top ring groove of the piston. The body member has an inner periphery, upper wall, lower wall and an outer periphery. The outer periphery has a concavity therein for storing lubricant therein. The upper wall has an outer section proximate to the outer periphery and is constructed to be resiliently flexible between a flexed and unflexed position such during a portion of the power stroke, the volume of the concavity to store the lubricant is decreased by the flexing of the upper wall to the flexed position for expelling lubricant therefrom to a wall of the cylinder. The wall resiliently returns to the unflexed position during other times to allow excess lubricant from the wall of the cylinder to pass into the concavity.

DESCRIPTION OF PREFERRED EMBODIMENTS

Figure 1:
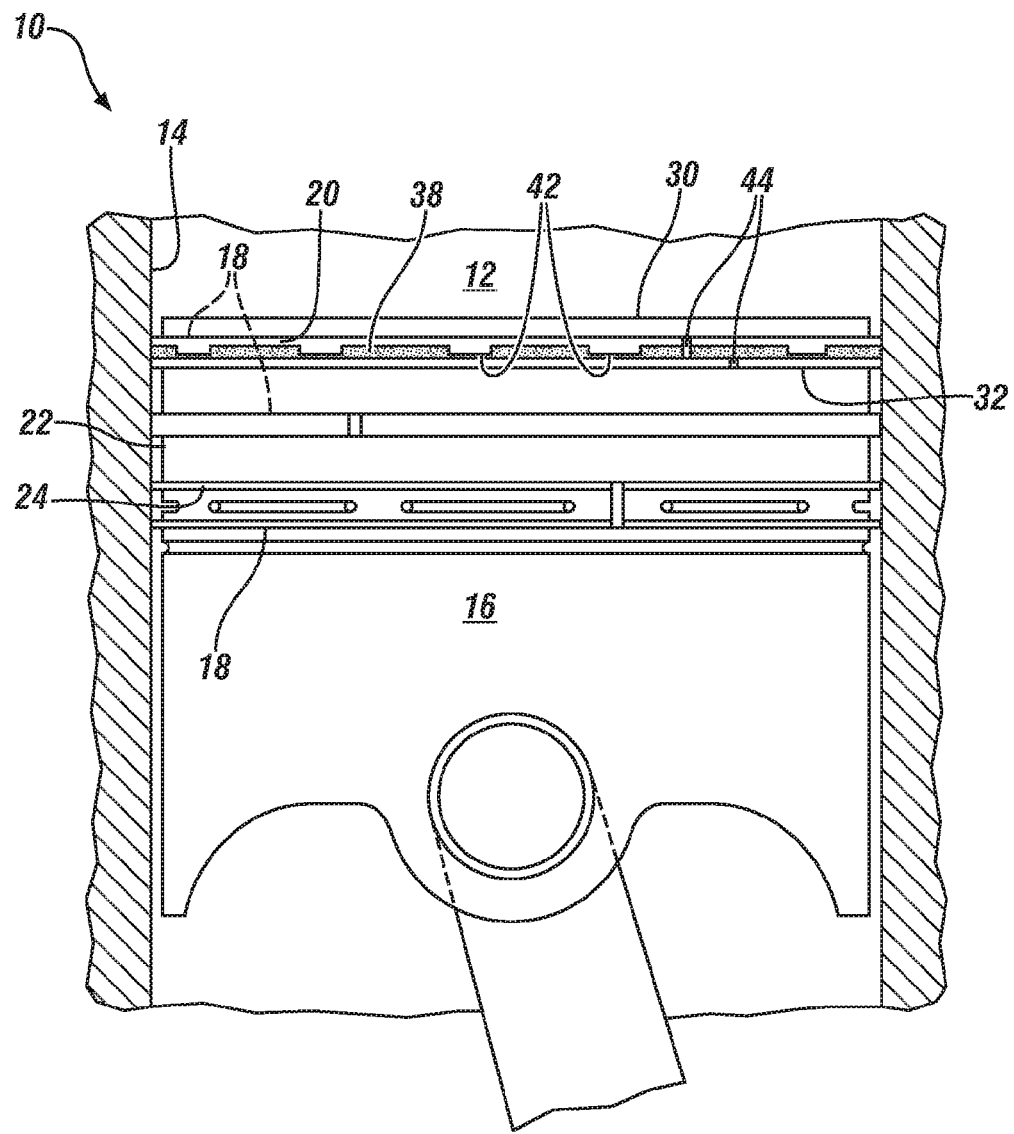
FIG. 1 is a segmented view of an internal combustion illustrating one cylinder and one piston with a piston ring in accordance with one embodiment of the invention.

Referring now to FIG. 1, an internal combustion engine 10 has a cylinder 12 with a cylinder wall 14. A piston 16 is constructed for receiprocating motion within the cylinder. The piston has three circumferentially placed grooves 18 axially spaced along the piston. The three grooves 18 seat a compression piston ring 20, a wiper ring 22, and an oil ring 24 respectively.

Figure 2:
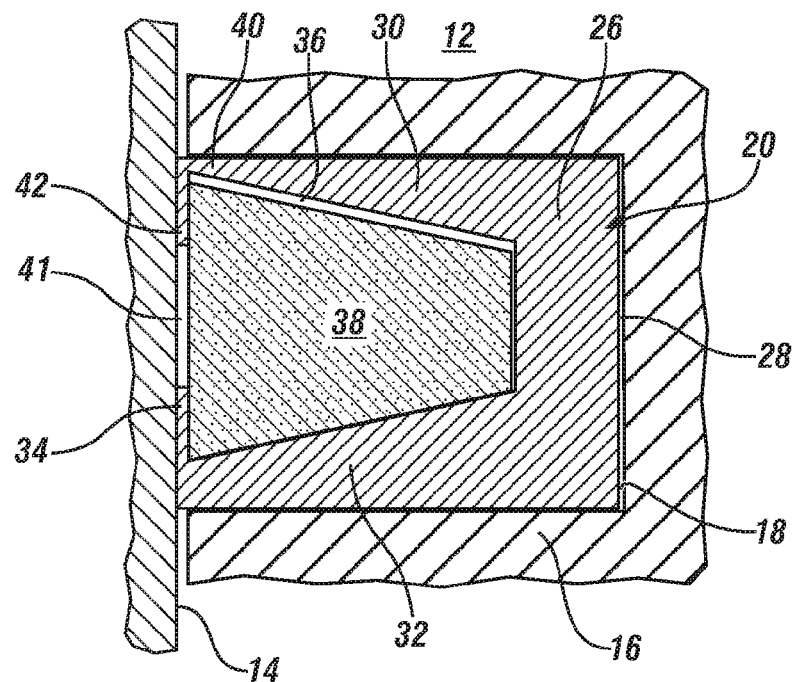
FIG. 2 is an enlarged fragmentary view of the invention shown in FIG. 1.
Figure 3:
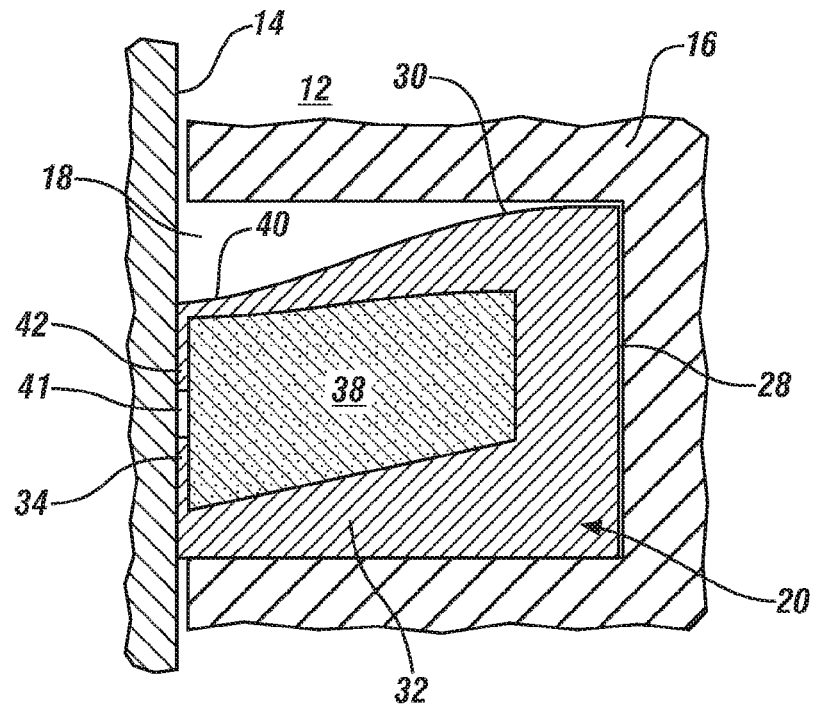
FIG. 3 is a view similar to FIG. 2 illustrating the flexing of the upper wall of the piston ring during a portion of a power stroke.

The compression ring 20 as more clearly shown in FIGS. 2 and 3 has a main circular shaped body member 26. The compression ring 20 has an inner peripheral wall 28, an upper wall 30 and a lower wall 32. An outer peripheral section 34 has a concavity or recess 36 extending around the ring 20 and open to the outer periphery through passage section 41. An insert member 38 that is porous and compressible is fitted in the concavity 36. For example, one material suitable for this insert is woven carbon fiber formed in a matrix. Other materials are possible if they are compressible, heat resistant, porous and lubricant absorbent.

The upper wall 30 has an outer section 40 above the concavity 36 that is tapered in a direction that narrows or thins out toward the outer peripheral section 34. The taper allows the upper wall 30 to flex during a portion of the power stroke when extreme gas pressure from the combustion is exerted on the upper wall as illustrated in FIG. 3.

The ring may also have an uneven split such that the upper wall 30 may have a thinner dimension than the lower wall 32. This uneven split can be provided by asymmetrical placement of the concavity 36 closer to the upper wall than the bottom wall or a different shape or different taper to the upper wall than the lower wall to provide for more flexibility of the upper wall section 40. For example, the upper wall 30 may be more severely tapered than lower wall 32. As shown in FIG. 3, the tapered wall 30 and lower wall 32 form a generally trapezoidal shaped concavity in cross-section and the insert 38 may have a generally corresponding trapezoidal shape in cross-section. The trapezoidal shaped concavity and insert (in cross-section) are oriented such that the concavity and insert has a corresponding larger axial dimension at its outer periphery than at its inner periphery or radial midsection.

This flexing in effect decreases the volume of the concavity 36 and compresses the insert 38 such that any oil or other lubricant used for the lubrication of the engine that is absorbed in the insert member 38 is squeezed out and pushed out of concavity 36 to the cylinder wall 14 during the boundary/mixed lubrication regime only. It has been found that the upper wall 30 can flex with respect to the lower wall 32 during mixed/boundary lubrication regime when upwardly directed frictional forces exerted on the lower wall section 32 are much greater than the upwardly directed frictional forces exerted on the upper wall section 30. The mixed boundary lubrication regime occurs most often during the top dead center position of the power stroke when the speed of the piston head with the respect to the cylinder is slowest and the combustion process is commenced in the cylinder, producing heat build-up that is transferred to the piston and cylinder. The condition can produce undesireable metal to metal contact with no or insufficient lubricant film between the piston ring and cylinder. This mixed boundary regime that provides metal to metal contact can produce micro-welds which can result in less efficiency, more wear on the engine and seizing of the engine if left uncontrolled.

This great discrepancy in frictional forces between the upper wall and lower wall during the mixed/boundary lubrication regime provides for a moment to be applied on the upper wall outer section 40 which flexes the upper wall outer section downward closer to the lower wall 32, compressing the insert 38 by the gas pressure decreasing the size of concavity 36 and thereby expelling lubricant from the concavity through passage 41 and onto the cylinder wall 14. Thus, increased lubricant film is applied during the time that lubrication is most needed to reduce or eliminate the metal to metal contact.

After the mixed lubrication regime is over and hydrodynamic lubrication regime occurs, the upwardly directed forces applied on the respective upper walls 30 becomes greater than the forces on the lower wall 32 and the upper wall outer section 40 resiliently biases back to the position shown in FIG. 2. The insert member 38 can then absorb excess oil or lubricant by contact from the wall of the cylinder during the hydrodynamic lubrication regime when oil or other lubricant film between the cylinder wall and piston ring is too thick. Any excess lubricant film during the hydrodynamic lubrication regime that would otherwise provide for increased frictional forces can be absorbed into the porous media of the insert 38 before the cycle is repeated.

A positive stop 42 may be provided at the outer periphery 34 of the ring to prevent the upper wall from overly flexing and overly compressing the insert beyond its elastic limits. The positive stop 42 may be in the form of circumferentially placed teeth downwardly extending from the upper wall 30 and constructed to abut the lower wall 32 before permanent deformation of the porous insert occurs. Other positive stops may be devised such as an internal posts and web formed in the insert which can abut the lower and upper walls when the walls come to a predetermined minimum distance.

The ring has a conventional radial split 44 for allowing conventional installation about the piston and for reducing blow-by gases.

It should be recognized that the flexure of the upper wall need not be circumferentially uniform. The mixed boundary regime may not be uniform about the piston ring and the greater forces may not occur simultaneously about the entire ring. Only the circumferential section of the upper wall that undergoes mixed boundary lubrication regime may flex to compress the respective circumferential section of the insert 38 in its proximity which expels the needed lubrication out of the passage 31 to the needed circumferentially located position in the cylinder. In this fashion, lubricant is squeezed onto the specific spots around the piston ring that need extra lubrication.

In certain applications, it may be acceptable to only have the concavity and have no porous compressible insert for applying the lubricant during the mixed/boundary lubrication regime and storing excess lubricant during the hydrodynamic lubrication regime. The decrease of size of the concavity forces stored lubrication therein out to the cylinder during the mixed boundary lubrication regime. The increase in size of the concavity during the hydrodynamic lubrication regime allows for entry of excess lubricant.

While this invention is best used and has the most benefit for use with the top compression ring, it may also be applied to the wiper ring. Furthermore, there is a possibility of eliminating the bottom oil ring in certain applications.

In this fashion, the invention provides for improved lubrication delivery by providing more specific lubrication at specific locations precisely when needed. The improved lubrication allows for a reduction in hydrodynamic lubrication drag related losses in two ways. It eliminates excess lubricant and also allows the use of lower viscosity lubricants. The use of lower viscosity lubricants also reduce the oil pump volume and pump associated losses. The use of lower viscosity lubricant still provides adequate hardware protection by specifically directing more lubricant at the required moments during localized mixed/boundary lubrication regimes. The use of lower viscosity lubricants also reduces the minimum torque to start an engine at low temperature and allows for battery size reduction needed for start requirements. The invention also may reduce NOx concentration at low temperature for emission benefits.

Other variations and modifications are possible without departing from the scope and spirit of the present invention as defined by the appended claims.

The invention claimed is:

1. A piston ring for a piston of internal combustion engine with an engine cylinder; said piston ring comprising:
   a body member for sitting in a ring groove of said piston;
   said body member having an inner periphery, upper wall, lower wall and an outer periphery;
   said outer periphery having a concavity therein for storing lubricant therein;
   said upper wall having an outer section proximate to said outer periphery being constructed to be resiliently flexible between a flexed and unflexed position such that during a portion of a power stroke, the volume of said concavity to store said lubricant is decreased by the flexing of said upper wall to the flexed position for expelling lubricant from the concavity to a wall of said cylinder, and said upper wall resiliently returns to said unflexed position during other times to allow excess lubricant from said wall of said cylinder to pass into said concavity;

an insert member being housed in said concavity that is porous to absorb lubricant and compressible to release said lubricant; and a positive stop member for limiting the flexing of said upper wall and the compression of said insert member.

2. A piston ring as defined in claim 1 further comprising:
said outer section of said upper wall proximate said outer periphery is tapered to said outer periphery.

3. A piston ring as defined in claim 1 further comprising:
said concavity being asymmetrically positioned closer to the upper wall than said lower wall.

4. A piston ring for a piston of internal combustion engine with an engine cylinder; said piston ring comprising:
a body member for sitting in a ring groove of said piston;
said body member having an inner periphery, upper wall, lower wall and an outer periphery;
said outer periphery having a concavity therein for storing lubricant therein;
said upper wall having an outer section proximate to said outer periphery being constructed to be resiliently flexible between a flexed and unflexed position such that during a portion of a power stroke, the volume of said concavity to store said lubricant is decreased by the flexing of said upper wall to the flexed position for expelling lubricant from the concavity to a wall of said cylinder, and said upper wall resiliently returns to said unflexed position during other times to allow excess lubricant from said wall of said cylinder to pass into said concavity;
an insert member being housed in said concavity that is porous to absorb lubricant and compressible to release said lubricant;
said insert member being a woven carbon fiber, and a positive stop member for limiting the flexing of said upper wall and the compression of said insert member.

5. A piston for a piston of internal combustion engine with an engine cylinder; said piston ring comprising:
a piston head having a side wall with at least one annular groove for seating a piston ring;
said piston ring having a body member for sitting in a top one of said at least one annular groove of said piston;
said body member having an inner periphery, upper wall, lower wall and an outer periphery;
said outer periphery having a concavity therein for storing lubricant therein;
said upper wall having an outer section proximate to said outer periphery being constructed to be resiliently flexible between a flexed and unflexed position such that during a portion of a power stroke, the volume of said concavity to store said lubricant is decreased by the flexing of said upper wall to said flexed position for expelling lubricant therefrom to a wall of said cylinder and said wall resiliently returns to said unflexed position during other times to allow excess lubricant from said wall of said cylinder to pass into said concavity;
an insert member being housed in said concavity, said insert being porous to absorb lubricant and compressible to release said lubricant;
said insert member being a woven carbon fiber; and
a positive stop member for limiting the flexing of said upper wall and the compression of said insert member.

6. A piston for an internal combustion engine with an engine cylinder, said piston comprising:
a piston head having a side wall with at least one annular groove for seating a piston ring;
said piston ring having a body member for sitting in a top one of said at least one annular groove of said piston;
said body member having an inner periphery, upper wall, lower wall and an outer periphery;
said outer periphery having a concavity therein for storing lubricant therein;
said upper wall having an outer section proximate to said outer periphery being constructed to be resiliently flexible between a flexed and unflexed position such that during a portion of a power stroke, the volume of said concavity to store said lubricant is decreased by the flexing of said upper wall to said flexed position for expelling lubricant therefrom to a wall of said cylinder and said wall resiliently returns to said unflexed position during other times to allow excess lubricant from said wall of said cylinder to pass into said concavity;
an insert member being housed in said concavity, said insert being porous to absorb lubricant and compressible to release said lubricant; and
a positive stop member for limiting the flexing of said upper wall and the compression of said insert member.

7. A piston as defined in claim 6 further comprising:
said outer section of said upper wall proximate said outer periphery is tapered to said outer periphery.

8. A piston as defined in claim 6 further comprising:
said concavity being asymmetrically positioned closer to the upper wall than said lower wall.

9. A piston as defined in claim 5 further comprising:
said outer section of said upper wall proximate said outer periphery is tapered to said outer periphery.

10. A piston ring as defined in claim 4 further comprising:
said outer section of said upper wall proximate said outer periphery is tapered to said outer periphery.

11. A piston ring for a piston of internal combustion engine with an engine cylinder; said piston ring comprising:
a body member for sitting in a ring groove of said piston;
said body member having an inner periphery, upper wall, lower wall and an outer periphery;
said outer periphery having a concavity therein for storing lubricant therein;
said outer section of said upper wall proximate said outer periphery is tapered to said outer periphery such that said concavity has a larger axial dimension at its outer periphery than at its inner periphery or radial midsection; and
said upper wall having an outer section proximate to said outer periphery being constructed to be resiliently flexible between a flexed and unflexed position such that during a portion of a power stroke, the volume of said concavity to store said lubricant is decreased by the flexing of said upper wall to the flexed position for expelling lubricant from the concavity to a wall of said cylinder, and said upper wall resiliently returns to said unflexed position during other times to allow excess lubricant from said wall of said cylinder to pass into said concavity.

12. A piston ring as defined in claim 11 further comprising:
an insert member being housed in said concavity that is porous to absorb lubricant and compressible to release said lubricant.

13. A piston ring as defined in claim 12 further comprising:
said insert member being a woven carbon fiber.

14. A piston ring as defined in claim 11 further comprising:
a positive stop member for limiting the flexing of said upper wall and the compression of said insert member.

15. A piston ring as defined in claim 11 further comprising:
said concavity and said insert member both being generally trapezoidal in cross-section.

16. A piston ring as defined in claim 15 further comprising:
said concavity being asymmetrically positioned closer to the upper wall than said lower wall.

17. A piston for an internal combustion engine with an engine cylinder, said piston comprising:
a piston head having a side wall with at least one annular groove for seating a piston ring;
said piston ring having a body member for sitting in a top one of said at least one annular groove of said piston;
said body member having an inner periphery, upper wall, lower wall and an outer periphery;
said outer periphery having a concavity therein for storing lubricant therein;
said outer section of said upper wall proximate said outer periphery is tapered to said outer periphery such that said concavity has a larger axial dimension at its outer periphery than at its inner periphery or radial midsection; and
said upper wall having an outer section proximate to said outer periphery being constructed to be resiliently flexible between a flexed and unflexed position such that during a portion of a power stroke, the volume of said concavity to store said lubricant is decreased by the flexing of said upper wall to said flexed position for expelling lubricant therefrom to a wall of said cylinder and said wall resiliently returns to said unflexed position during other times to allow excess lubricant from said wall of said cylinder to pass into said concavity.

18. A piston ring as defined in claim 17 further comprising:
said concavity and said insert member both being generally trapezoidal in cross-section.

19. A piston as defined in claim 17 further comprising:
an insert member being housed in said concavity;
said insert being porous to absorb lubricant and compressible to release said lubricant; and
said insert member being a woven carbon fiber.

20. A piston ring as defined in claim 17 further comprising:
a positive stop member for limiting the flexing of said upper wall and the compression of said insert member; and
said concavity being asymmetrically positioned closer to the upper wall than said lower wall.

* * * * *